(12) United States Patent
Takahashi

(10) Patent No.: US 8,733,221 B2
(45) Date of Patent: May 27, 2014

(54) GROOVE MACHINING APPARATUS FOR INSULATING SPACER AND GROOVE MACHINING METHOD FOR THE SAME

(75) Inventor: Masahiro Takahashi, Tatsuno (JP)

(73) Assignee: Idemitsu Kogyo Corporation, Hyogo (JP)

(*) Notice: Subject to any disclaimer, the term of this patent is extended or adjusted under 35 U.S.C. 154(b) by 358 days.

(21) Appl. No.: 13/313,384

(22) Filed: Dec. 7, 2011

(65) Prior Publication Data

US 2013/0047815 A1  Feb. 28, 2013

(30) Foreign Application Priority Data

Aug. 24, 2011  (JP) .................. 2011-182776

(51) Int. Cl.
*B26D 3/06* (2006.01)
(52) U.S. Cl.
USPC ............. 83/875; 29/33 P; 29/563; 198/345.3; 198/346.1
(58) Field of Classification Search
USPC .......... 83/875, 876, 877; 409/143; 198/345.3, 198/346.1
See application file for complete search history.

(56) References Cited

U.S. PATENT DOCUMENTS

| | | | | |
|---|---|---|---|---|
| 4,090,287 A | * | 5/1978 | Selander | 483/1 |
| 4,373,840 A | * | 2/1983 | Miller, Jr. | 198/346.1 |
| 4,583,631 A | * | 4/1986 | Yonezawa et al. | 198/345.3 |
| 7,721,398 B2 | * | 5/2010 | Bernhard et al. | 29/33 P |
| 8,573,908 B2 | * | 11/2013 | Imanishi et al. | 409/167 |
| 2008/0139371 A1 | * | 6/2008 | Segawa et al. | 483/14 |

FOREIGN PATENT DOCUMENTS

| | | | | |
|---|---|---|---|---|
| EP | 466062 A1 | * | 1/1992 | ............. B23P 23/06 |
| GB | 2124942 A | * | 2/1984 | ............. B23Q 7/00 |
| JP | 55112753 A | * | 8/1980 | ............. B23Q 39/00 |
| JP | 01058506 A | * | 3/1989 | ............. B28B 11/14 |
| JP | 06037180 A | * | 2/1994 | ............. H01L 21/78 |
| JP | 8-051036 | | 2/1996 | |
| JP | 2003-062718 | | 3/2003 | |
| JP | 2007-245289 | | 9/2007 | |
| JP | 2010-212374 | | 9/2010 | |
| JP | 3166977 | | 3/2011 | |
| WO | WO-2010/103946 | | 9/2010 | |

* cited by examiner

*Primary Examiner* — Kenneth E. Peterson
*Assistant Examiner* — Jennifer Swinney
(74) *Attorney, Agent, or Firm* — Jordan and Hamburg LLP

(57) ABSTRACT

A groove machining apparatus for an insulating spacer includes a cutting blade that is removably fixed to a rotation shaft rotatable around a horizontal axis and movable in a right-left direction and in an up-down direction and mounts for a cassette that are fixed in a loading/unloading position opposing an entrance through which the cassette can be loaded/unloaded and in a working position 180 degrees apart from the loading/unloading position and facing the cutting blade, respectively, on a rotary table. The apparatus includes positioning devices that are respectively located in the vicinity of the mounts to position and fix the cassette to the mounts, and a clamping device that corresponds to the cassette in the working position and presses opposing edges in a front-back direction of a plurality of insulating spacers aligned on the cassette.

7 Claims, 9 Drawing Sheets

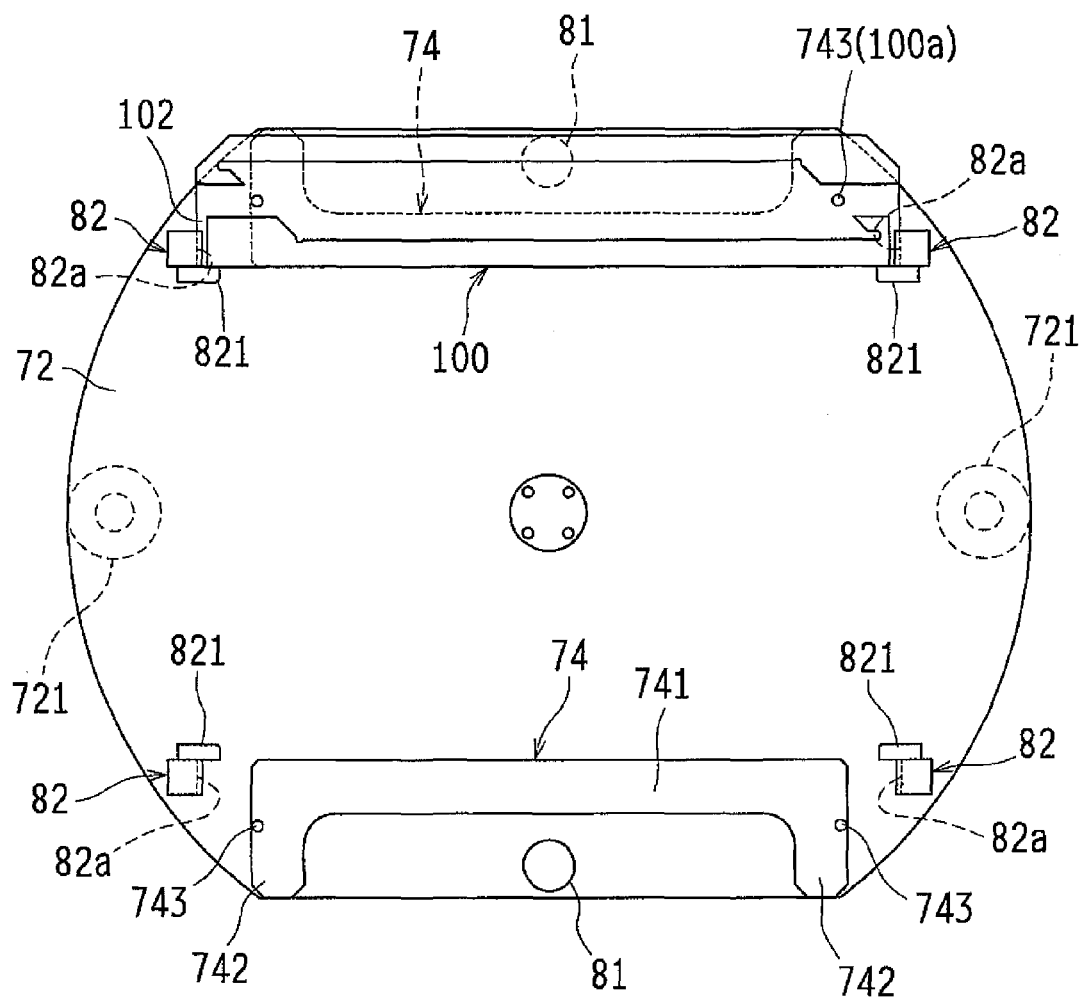

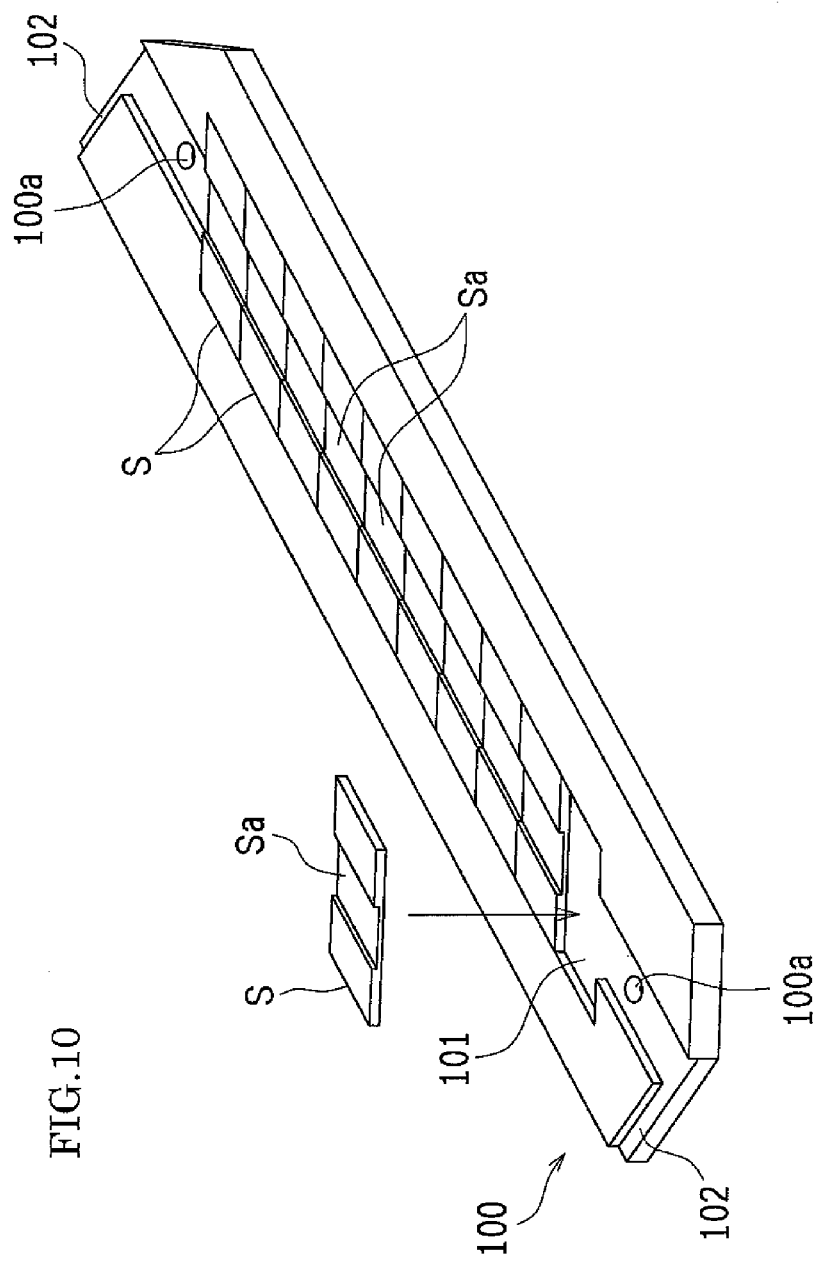

GROOVE MACHINING APPARATUS FOR INSULATING SPACER AND GROOVE MACHINING METHOD FOR THE SAME

CROSS-REFERENCE TO RELATED APPLICATIONS

This application claims priority under 35 U.S.C. §119(a) on Patent Application No. 2011-182776 filed in Japan on Aug. 24, 2011, the entire contents of which are herein incorporated by reference.

BACKGROUND OF THE INVENTION

1. Field of the Invention

The present invention relates to a groove machining apparatus that forms grooves for oil passages in insulating spacers of oil-filled transformers and a groove machining method for such groove machining apparatuses.

2. Description of the Related Art

Generally, coils of oil-filled transformers are produced by winding a copper wire on which thin insulating paper of several tens of microns is wound into the coil form. Moreover, insulators composed of an insulating plate formed by cutting pressboard having a thickness of several millimeters corresponding to the coil into a predetermined shape and multiple insulating spacers attached to set positions on the insulating plate are arranged between coils and between the coils and ground (see FIG. 8 in JP 8-51036A, for example). Specifically, although insulating spacers are cut into various shapes in accordance with the positions at which the insulating spacers are arranged with respect to the coils, principally, insulating spacers are formed into the shape of a parallelogram whose two non-parallel sides form an angle of 45 degrees, and even though the vertical and horizontal dimensions are slightly different depending on the size or the type of transformers, for example, in the case of a 275 kV transformer used for electric power transmission from a power plant, 50,000 to 60,000 insulating spacers per phase are used.

Here, insulating spacers function as electrical insulation and also function as an oil flow duct that secures a passage for an appropriate insulating oil on the coil surface for the purpose of cooling. In this case, in order to supply the insulating oil to the coil surface more efficiently, formation of grooves in insulating spacers has also been proposed and implemented (see JP 2003-62718A, for example). Specifically, when a short side of an insulating spacer is regarded as the base, a groove parallel to the base is formed, and this groove has a preset width and depth. The center of this groove in a width direction is set to be the middle point of the insulating spacer having a parallelogram shape.

It should be noted that pressboard is a flat plate material that is produced by laminating wet paper made of kraft pulp fiber or the like and applying pressure to the laminate.

SUMMARY OF THE INVENTION

According to JP 2003-62718A described above, in which grooves for oil passages are formed in insulating spacers, a cassette on which a plurality of insulating spacers are aligned is conveyed, and during the conveying step, cuts of a set depth are formed in positions, of each insulating spacer, corresponding to both edges of the grooves in the width direction by two serrated cutting rotary blades, and the portion between the two cuts formed by the cutting rotary blades is shaved off by a slanting, serrated grooving rotary blade.

Thus, the grooving rotary blade comes into contact with the insulating spacer in a slanting state, which has the disadvantage that the conveyance speed of the cassette is restricted, and the productivity is low. Moreover, since surfaces machined by the serrated rotary blades have low smoothness and the cutting rotary blades and the grooving rotary blade have different axes, when the grooving rotary blade wears, a step (unevenness) will occur between the surface machined by the grooving rotary blade and the surfaces cut by the cutting rotary blades. Accordingly, the resistance of the passage for cooling oil will change, leading to a flow of the cooling oil different from the flow that has been simulated in advance, and therefore there is a risk that the required cooling effect may not be achieved. Furthermore, since pressboard is produced by laminating and compressing wet paper, the serrated rotary blades are likely to leave a burr or fuzz on the machined surface of the grooves, and if the burr or fuzz that has been left exfoliate as a result of long-term use, the exfoliated particles will mix into the cooling oil as foreign matter and accelerate clogging of a filter. Thus, there have been problems in that the yield of insulating spacers is low, and postprocessing for removing the step, burr or fuzz left on the machined surface of the grooves is necessary, thus increasing the cost.

The present invention has been made in view of problems as described above and provides a groove machining apparatus that can efficiently form grooves having a machined surface with excellent smoothness and having a set width and a set depth in insulating spacers made from pressboard or the like without causing burring or the like, and a groove machining method for such groove machining apparatuses.

A groove machining apparatus for an insulating spacer of the present invention includes a cutting blade that is removably fixed to a rotation shaft rotatable around a horizontal axis of a rotation shaft device and that is movable in a right-left direction and in an up-down direction via an X-axis moving device and a Y-axis moving device, respectively, mounts for a cassette that are fixed in a loading/unloading position opposing an entrance through which the cassette can be loaded/unloaded and in a working position 180 degrees apart from the loading/unloading position and facing the cutting blade, respectively, on a rotary table that is rotatable around a vertical axis of a turning device, positioning devices that are respectively located in the vicinity of the mounts to position and fix the cassette to the mounts, and a clamping device that corresponds to the cassette in the working position and presses opposing edges in a front-back direction of a plurality of insulating spacers aligned on the cassette, wherein the cassette disposed on the positioning device in the loading/unloading position for a cassette is fixed to the mount and rotated 180 degrees to the working position facing the cutting blade, the opposing edges in the front-back direction of the plurality of insulating spacers aligned on the cassette are pressed and fixed, and the cutting blade rotating at a set level is moved in the right-left direction, so that grooves of a set width and a set depth are sequentially formed in the plurality of insulating spacers.

According to the present invention, in the loading/unloading position opposing the entrance through which a cassette can be loaded/unloaded, of the rotary table, a cassette on which a plurality of insulating spacers are aligned in the right-left direction is positioned and fixed to the mount by the positioning device. Subsequently, the rotary table is rotated 180 degrees via the turning device to move the cassette to the working position facing the cutting blade. Then, opposing edges in the front-back direction of the plurality of insulating spacers aligned in the right-left direction on the cassette are pressed and fixed via the clamping device, and afterward, the cutting blade is rotated via the rotation shaft device while being held at a set level via the Y-axis moving device, and then moved in the right-left direction via the X-axis moving device. Thus, the rotating cutting blade sequentially cuts the plurality of insulating spacers aligned in the right-left direction on the cassette and forms a groove of a set width and a set depth in a set position of each insulating spacer.

As a result, it is possible to efficiently form a groove of a set width and a set depth in an insulating spacer made from pressboard or the like, without causing burring or the like in the insulating spacer.

In the present invention, it is preferable that the apparatus includes a liftable inner shutter that blocks the working position and the loading/unloading position of the rotary table, and a liftable outer shutter that blocks the entrance opposing the loading/unloading position. Thus, for example, only in a state where the inner shutter blocks the loading/unloading position and the working position can the entrance opposing the loading/unloading position be opened by actuating the outer shutter, and this, together with the restriction on rotation of the rotary table, makes it possible to safely place or remove the cassette in or from the loading/unloading position through the entrance regardless of the groove machining work that is performed on the insulating spacers by the cutting blade in the working position.

A groove machining method for an insulating spacer of the present invention includes causing a plurality of insulating spacers that are aligned on a cassette fixed to a rotary table and whose opposing edges in a front-back direction are pressed to face a cutting blade that can move back and forth in a right-left direction and in an up-down direction and that can rotate around a horizontal axis, moving the cutting blade in the right-left direction while rotating the cutting blade at a set level, and forming grooves of a set width and a set depth sequentially in the plurality of insulating spacers.

According to the present invention, a cassette on which a plurality of insulating spacers are aligned in the right-left direction is fixed to the rotary table, and then the rotary table is rotated to cause the plurality of insulating spacers aligned on the cassette to face the cutting blade. Subsequently, opposing edges in the front-back direction of the plurality of insulating spacers are pressed against the cassette, then the plurality of insulating spacers are sequentially cut by moving the cutting blade in the right-left direction while rotating the cutting blade at a set level, and thus grooves of a set width and a set depth are formed in a set position of the insulating spacers.

As a result, it is possible to efficiently form grooves of a set width and a set depth in insulating spacers made from pressboard.

In the present invention, it is preferable that the cutting blade is formed by placing together a left-hand cutting blade in which a plurality of sets of a flat blade and a left marking blade are provided and a right-hand cutting blade in which a plurality of sets of a flat blade and a right marking blade are provided in such a manner that the sets of the flat blade and the left marking blade of the left-hand cutting blade and the sets of the flat blade and the right marking blade of the right-hand cutting blade alternate. This makes it possible to form grooves having a machined surface with excellent smoothness and having a set width and a set depth in insulating spacers made from pressboard while suppressing burring and fuzzing.

In the present invention, it is preferable that the cutting blade when moving backward is lower than that when moving forward by a set height. This makes it possible that even if a burr or fuzz occurs on the machined surface of the grooves of the insulating spacers when the cutting blade moves forward during groove machining work, the burr or fuzz can be removed when the cutting blade moves backward, by slightly cutting the machined surface of the grooves formed by the forward movement in such a manner that the cutting blade traces the machined surface. Therefore, it is possible to reliably form grooves having a machined surface with excellent smoothness and having a set width and a set depth without causing burring and fuzzing by merely moving the cutting blade back and forth, and it is possible to form grooves even more efficiently.

In the present invention, it is preferable that one or more spacers can be disposed between the left-hand cutting blade and the right-hand cutting blade. This makes it possible to form grooves of any groove width between the minimum width that is obtained when the left-hand cutting blade and the right-hand cutting blade are directly placed together and the maximum width that is obtained when an inner edge of the cutting edge of the flat blade of the left-hand cutting blade and an inner edge of the cutting edge of the flat blade of the right-hand cutting blade slightly overlap with each other.

BRIEF DESCRIPTION OF THE DRAWINGS

FIG. 6 is a plan view for explaining a positioning device provided on a rotary table of a turning device.

FIG. 10 is a perspective view showing an example of a cassette that is used to machine grooves in insulating spacers as well as the insulating spacers in which grooves have been machined.

DESCRIPTION OF THE PREFERRED EMBODIMENTS

Figure 1:
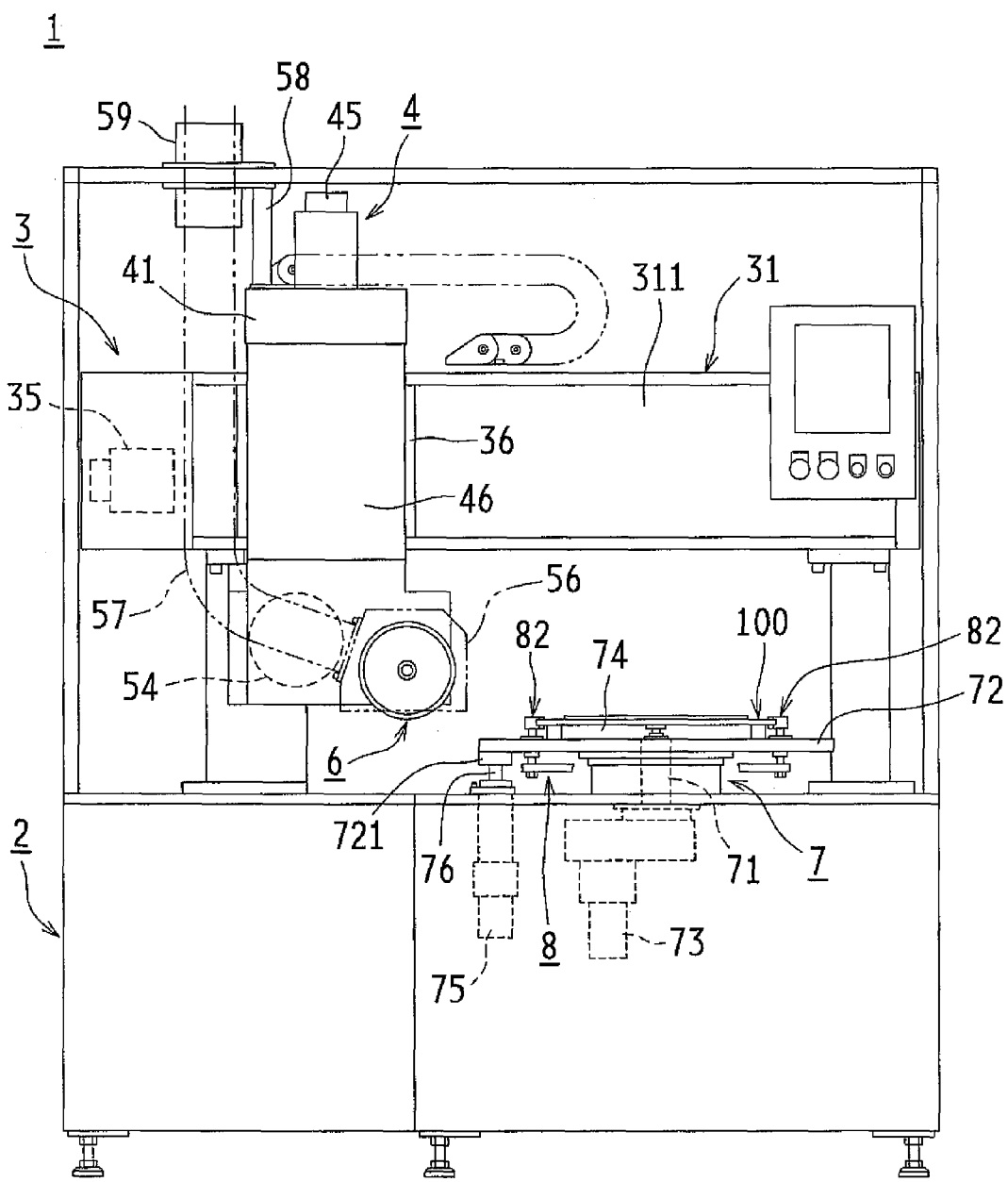
FIG. 1 is a front view showing an embodiment of a groove machining apparatus for an insulating spacer according to the present invention.
Figure 2:
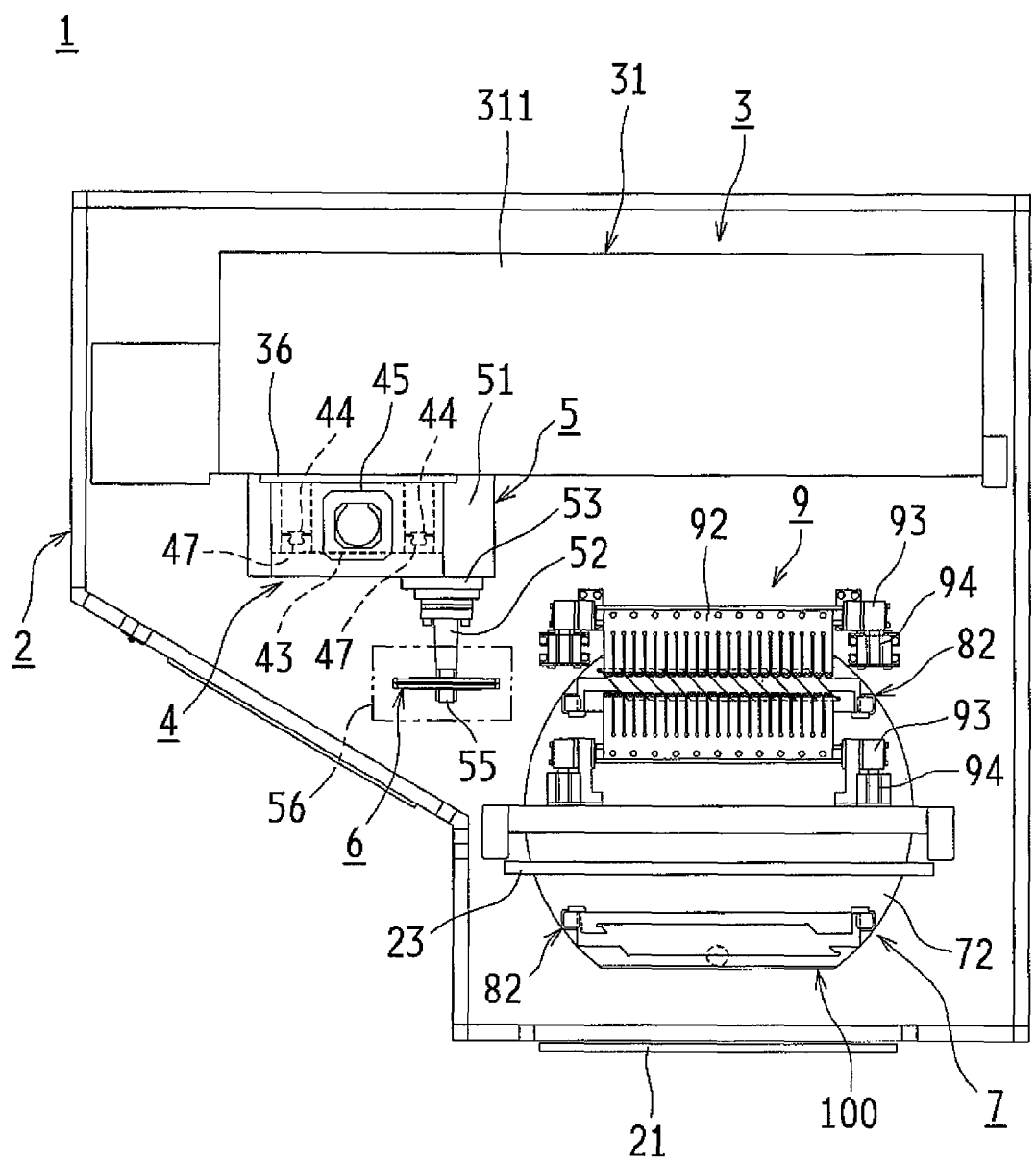
FIG. 2 is a plan view of the groove machining apparatus for an insulating spacer shown in FIG. 1.
Figure 3:
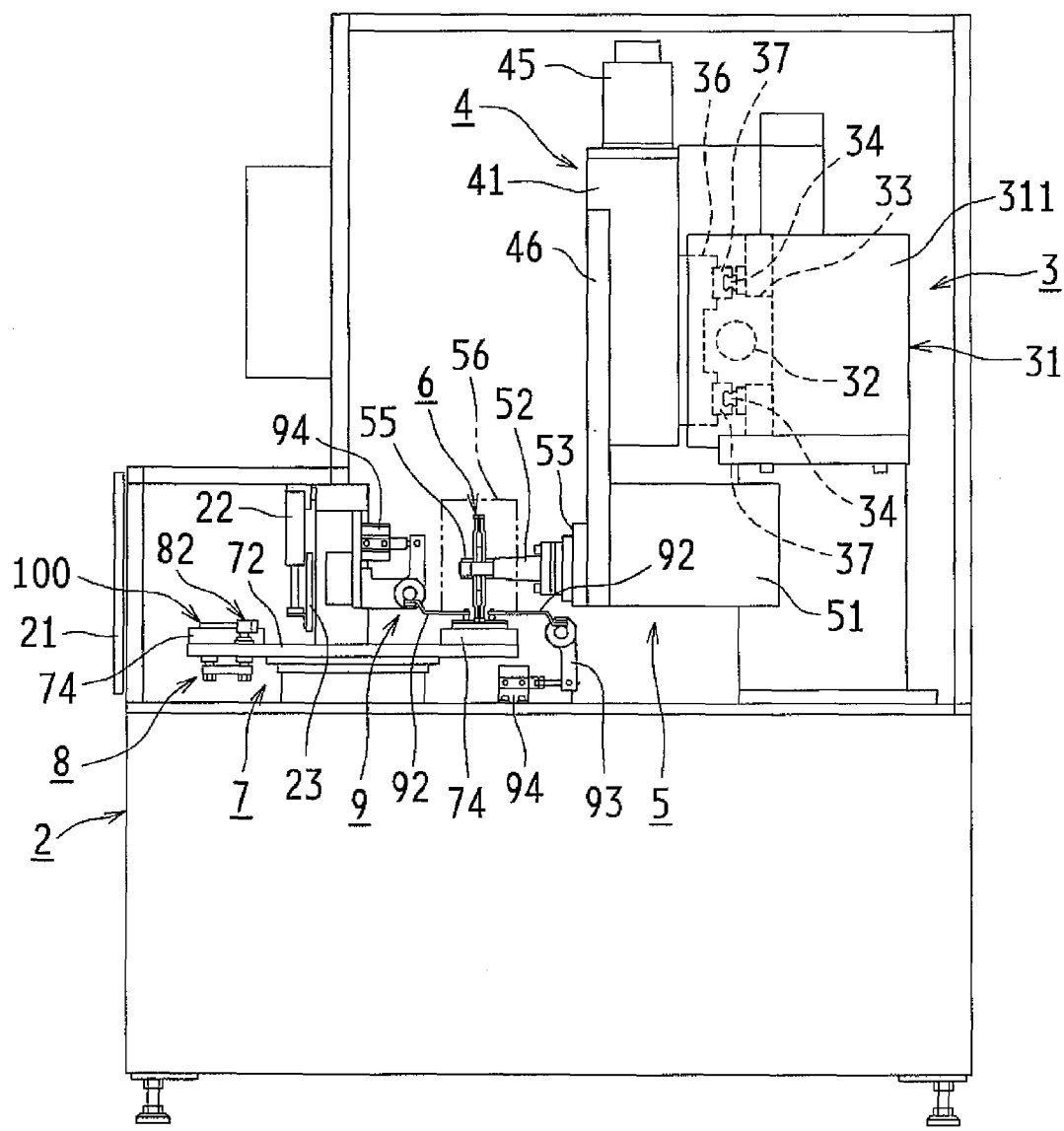
FIG. 3 is a side view of the groove machining apparatus for an insulating spacer shown in FIG. 1.
Figure 4:
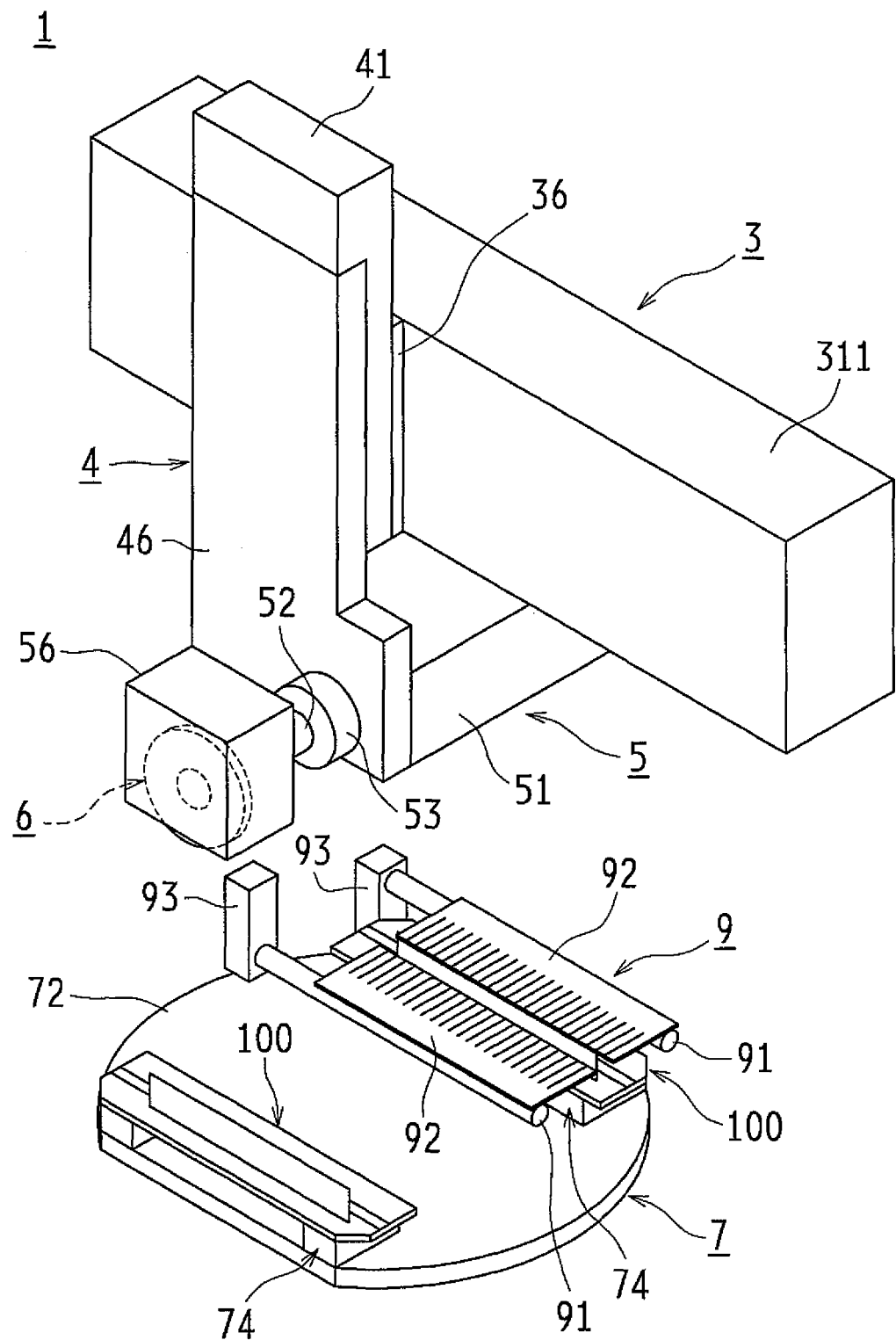
FIG. 4 is a partially omitted perspective view showing the groove machining apparatus for an insulating spacer shown in FIG. 1.

Hereinafter, an embodiment of the present invention will be described with reference to the drawings.

FIGS. 1 to 4 show an embodiment of a groove machining apparatus 1 according to the present invention.

It should be noted that before describing the groove machining apparatus 1, a cassette 100 that is used in machining grooves in insulating spacers S will be described. This cassette 100 is, as shown in FIG. 10, an approximately rectangular plate whose front left and right corners are cut off so as to conform to an outer circumferential circle of a rotary table 72 (described later) when viewed from above, and in order that a plurality of (ten in an embodiment) insulating spacers S can be aligned in a right-left direction when their short sides are regarded as the bases, a parallelogram-shaped recess 101 having a horizontal dimension that is multiple times longer than the length of a short side of each insulating spacer S, a vertical dimension that corresponds to the height of the insulating spacer S when the short side is regarded as the base, and a depth that is less than or equal to the thickness of the insulating spacer S is formed in the cassette 100. In addition, mounting holes 100a that are engageable with fixing pins 743 provided on a mount 74 (described later) are formed in left and right end portions, respectively, of the cassette 100, and furthermore, step portions 102 for disposing positioning members 82 thereon are formed in left and right edge portions, respectively.

The groove machining apparatus 1 sequentially cuts a plurality of insulating spacers S that are aligned on the cassette 100 in advance to form grooves Sa having a set width and a set depth, and is configured of an X-axis moving device 3 that is provided with a moving frame 36 movable in a right-left direction relative to a base 2 (the right-left direction in FIG. 1), a Y-axis moving device 4 that is fixed to the moving frame 36 of the X-axis moving device 3 and that is provided with a lifting/lowering frame 46 movable in an up-down direction (the top-bottom direction in FIG. 1), a rotation shaft device 5 that is fixed to the lifting/lowering frame 46 of the Y-axis moving device 4 and that is provided with a rotation shaft 52 rotatable around a horizontal axis orthogonal to the right-left direction and the up-down direction, a cutting blade 6 that is removably fixed to the rotation shaft 52 of the rotation shaft device 5, a turning device 7 that is provided with a rotary table 72 rotatable around a vertical axis relative to the base 2, a positioning device 8 that positions and fixes the cassette 100 to the rotary table 72 of the turning device 7, and a clamping device 9 that presses a plurality of insulating spacers S aligned on the cassette 100.

The X-axis moving device 3 is configured of a screw shaft 32 that is rotatably supported in a horizontal portion 311 of a portal frame 31 provided upright on the base 2 with an axis of rotation of the screw shaft 32 extending in the right-left direction, a nut member 33 that is rotatably screwed to the screw shaft 32, a pair of linear bearings 34 that are disposed in the horizontal portion 311 of the portal frame 31 parallel to each other with the screw shaft 32 sandwiched between them, a servomotor 35 coupled to the screw shaft 32, and the moving frame 36 to which the nut member 33 is fixed, and a pair of receiving members 37 that are respectively in slidable engagement with the pair of linear bearings 34 are fixed to the moving frame 36. Thus, in the X-axis moving device 3, when the servomotor 35 is rotatively driven, the screw shaft 32 rotates, and thus the nut member 33, and hence the moving frame 36 via the receiving members 37, can be moved in the right-left direction along the pair of linear bearings 34.

The Y-axis moving device 4 is configured of a box-shaped frame 41 that is integrally fixed to the moving frame 36 of the X-axis moving device 3, a screw shaft (not shown) that is rotatably supported in the box-shaped frame 41 with the axis of rotation extending in the up-down direction, a nut member 43 that is rotatably screwed to the screw shaft, a pair of linear bearings 44 that are disposed in the box-shaped frame 41 parallel to each other with the screw shaft sandwiched between them, a servomotor 45 that is coupled to the screw shaft, and the lifting/lowering frame 46 that is fixed to the nut member 43, and a pair of receiving members 47 that are respectively in slidable engagement with the pair of linear bearings 44 are fixed to the lifting/lowering frame 46. Thus, in the Y-axis moving device 4, when the servomotor 45 is rotatively driven, the screw shaft rotates, and the nut member 43, and hence the lifting/lowering frame 46 via the receiving members 47, can be moved in the up-down direction along the pair of linear bearings 44.

The rotation shaft device 5 is configured of a frame 51 that is integrally coupled to the lifting/lowering frame 46 of the Y-axis moving device 4, a spindle 53 that is fixed to the frame 51 and that rotatably supports the rotation shaft 52, and a servomotor 54 that is provided in the frame 51, and the rotation shaft 52 of the spindle 53 and the servomotor 54 are coupled to each other via a belt pulley, which is not shown. Thus, in the rotation shaft device 5, when the servomotor 54 is rotatively driven, the rotation shaft 52 can be rotated around its horizontal axis via the belt pulley.

Figure 5B:
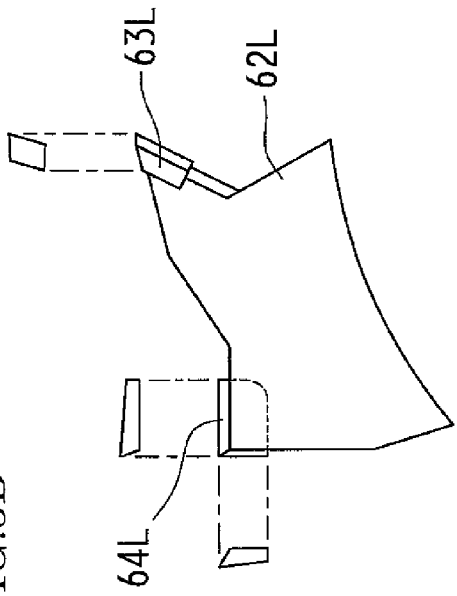
FIG. 5B is an arrow view for explaining a flat blade and a marking blade in a portion R in FIG. 5A.
Figure 5C:
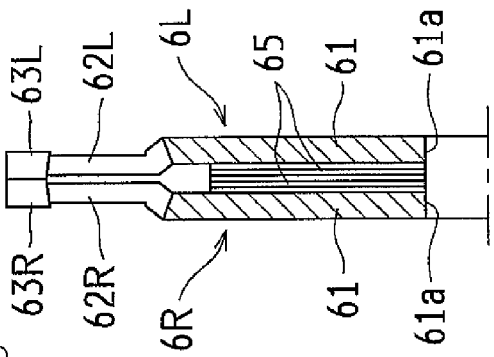
FIG. 5C is a view from arrows B-B in FIG. 5A.
Figure 5A:
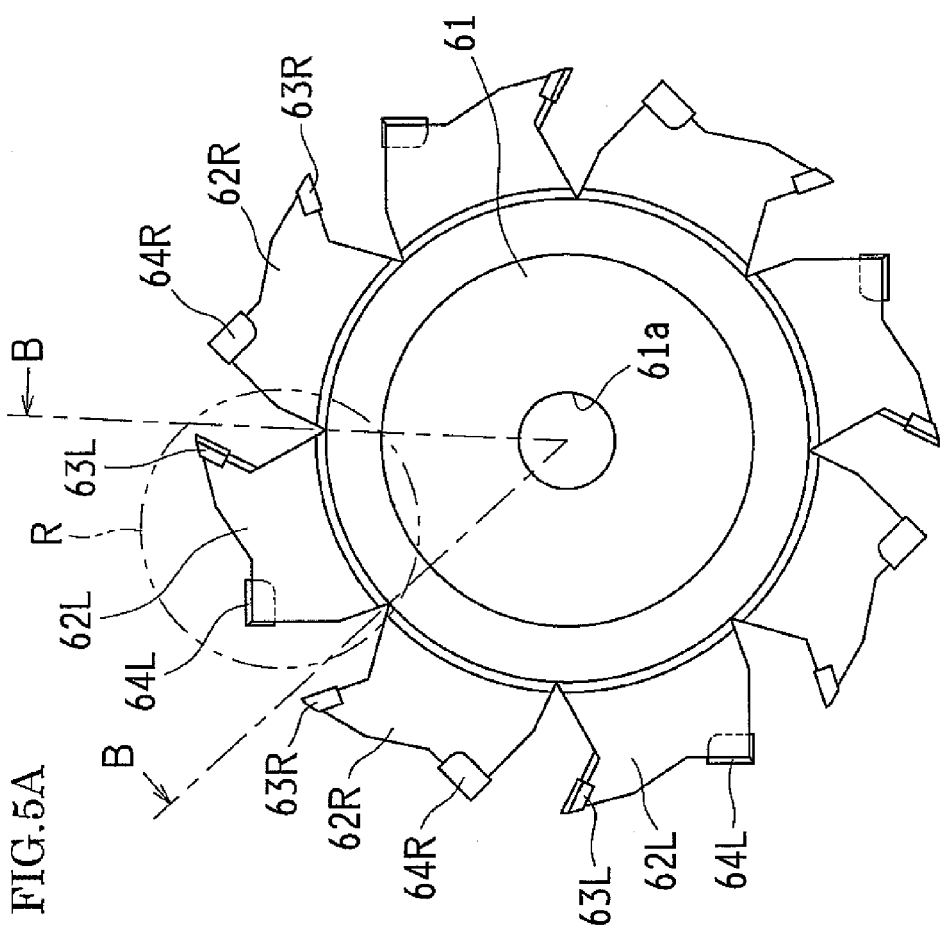
FIG. 5A is a front view of a cutting blade.

The cutting blade 6 is formed by placing together a left-hand cutting blade 6L and a right-hand cutting blade 6R as shown in detail in FIGS. 5A to 5C, and is removably fixed to a leading end of the rotation shaft 52 of the rotation shaft device 5 via a locknut 55. The left-hand cutting blade 6L has a main body 61 having at its center a shaft hole 61a corresponding to the above-described rotation shaft 52, and a plurality of (in the embodiment, four) claw portions 62L are provided on an outer circumference of the main body 61 at set intervals in a circumferential direction, each claw portion 62L being provided with a flat blade 63L and a left marking blade 64L sequentially fixed thereto. Similarly, the right-hand cutting blade 6R also has a main body 61 having at its center a shaft hole 61a, and a plurality of (in the embodiment, four) claw portions 62R are provided on an outer circumference of the main body 61 at set intervals in the circumferential direction, each claw portion 62R being provided with a flat blade 63R and a right marking blade 64R sequentially fixed thereto. Therefore, when the cutting blade 6 is formed by placing together the left-hand cutting blade 6L and the right-hand cutting blade 6R, the sets of the flat blade 63L and the left marking blade 64L, of the left-hand cutting blade 6L, and the sets of the flat blade 63R and the marking blade 64R, of the right-hand cutting blade 6R, can be arranged alternately.

Here, the flat blade 63 (L, R) is a chip that is welded to the front of the claw portion 62 (L, R) when the claw portion is viewed from the direction of rotation, and with the flat blade 63L of the left-hand cutting blade 6L and the flat blade 63R of the right-hand cutting blade 6R, a groove Sa corresponding to the width of cut and having a machined surface with excellent smoothness can be formed in an insulating spacer S. Meanwhile, the marking blade 64 (L, R), which is located behind the flat blade 63 (L, in the direction of rotation, is composed of chips welded to left and right side surfaces, respectively, of the claw portion 62 (L, R) when the claw portion is viewed from the direction of rotation, and can form cutting faces having a machined surface with excellent smoothness in positions respectively corresponding to left and right edges of the groove Sa in the insulating spacer S.

It should be noted that the cutting blade 6 can form a groove Sa of any width between the minimum groove width that is obtained when the left-hand cutting blade 6L and the right-hand cutting blade 6R are directly placed together and the maximum groove width that is obtained when one or more spacers 65 are interposed between the two cutting blades and thus an inner edge of the cutting edge of the flat blade 63L of the left-hand cutting blade 6L and an inner edge of the cutting edge of the flat blade 63R of the right-hand cutting blade 6R slightly overlap with each other.

The turning device 7 is configured of a rotation shaft 71 that is rotatably supported so as to rotate around a vertical axis relative to the base 2, the rotary table 72 that is fixed to the rotation shaft 71, and a servomotor 73 that is fixed to the base 2, and the rotation shaft 71 and the servomotor 73 are coupled to each other via mutually engaging gears, which are not shown (see FIG. 1). Thus, in the turning device 7, when the servomotor 73 is rotatively driven, the rotation shaft 71 and hence the rotary table 72 can be rotated via the gears. In the present embodiment, the rotation of the servomotor 73 is controlled such that the rotary table 72 intermittently makes a rotation of 180 degrees.

Here, the rotary table 72 is in a disk shape from which bow-shaped portions that are symmetrical with respect to the diameter of the disk shape are cut off, as shown in FIG. 6. Moreover, facing each of straight line portions of the rotary table 72 corresponding to the bowstrings of the bow-shaped portions, a mount 74 is fixed, the mount 74 being configured of a horizontal portion 741 that is parallel to the straight line portion when viewed from above and a pair of perpendicular portions 742 that extend from left and right ends, respectively, of the horizontal portion 741 toward the straight line portion. Therefore, when one mount 74 is in a working position facing the cutting blade 6, the other mount 74, which is 180 degrees apart therefrom, is in a loading/unloading position opposing an entrance for a worker loading/unloading the cassette 100 therethrough. Moreover, fixing pins 743 protrude from outer back corners, in the right-left direction, of the left and right perpendicular portions 742 of each mount 74, and are set so as to fit into the mounting holes 100a of the cassette 100.

Furthermore, in a back surface of the rotary table 72, positioning recesses 721 are formed at both ends on the same radius of a diameter that passes through the center of the rotary table 72 and that is parallel to the straight line portions. Meanwhile, a positioning pin 76 that corresponds to the positioning recesses 721 of the rotary table 72 and that is slidable in the up-down direction via a positioning cylinder 75 is provided on the base 2 (see FIG. 1). Therefore, once the rotary table 72 is rotated 180 degrees, the positioning pin 76 opposes either of the positioning recesses 721, and at that time, when the positioning cylinder 75 is extended, a leading end of the positioning pin 76 fits into the positioning recess 721, and thus rotation of the rotary table 72 can be restricted.

Figure 7:
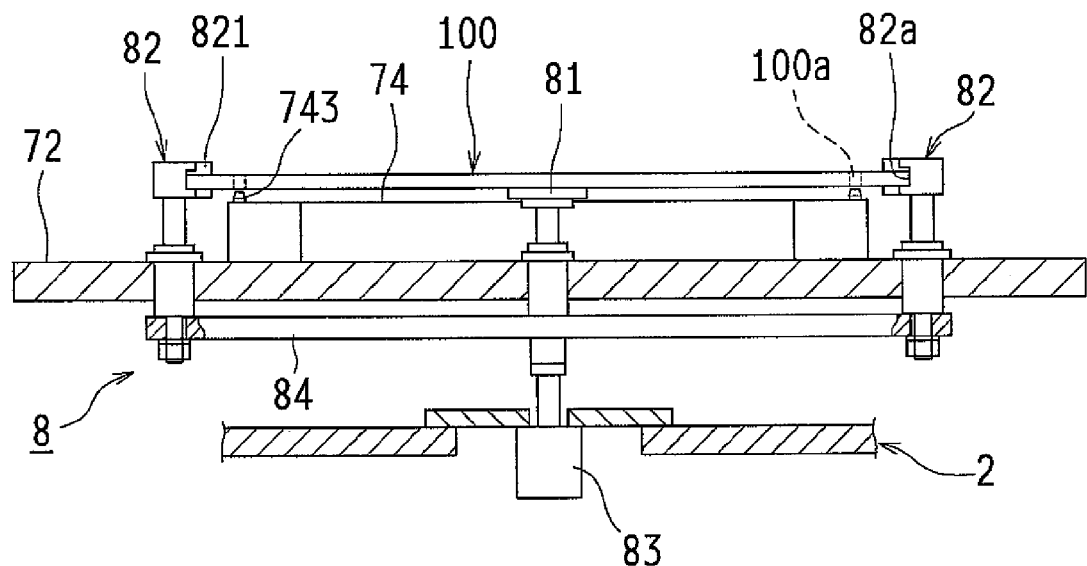
FIG. 7 is a front view showing the positioning device in a state in which a cassette can be loaded/unloaded.
Figure 8:
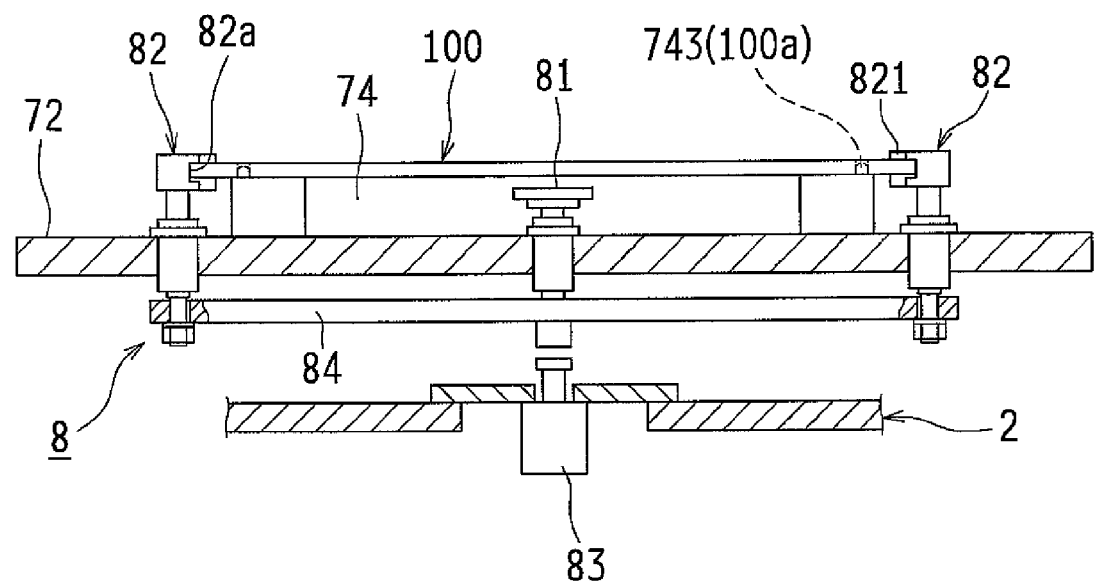
FIG. 8 is a front view showing the positioning device in a state in which a cassette is fixed.

The positioning device 8 is configured of, as shown in FIGS. 6 to 8, a support 81 that is provided on the rotary table 72 at the midpoint between the left and right perpendicular portions 742 of each mount 74 so as to be slidable in the up-down direction, a pair of positioning members 82 that are provided on the rotary table 72 in the vicinity of the outside of the horizontal portion 741 of each mount 74 in the right-left direction so as to be slidable in the up-down direction, and a preparation cylinder 83 that is provided in the base 2 so as to oppose the support 81, and on the back surface side of the rotary table 72, the support 81 is coupled to the left and right positioning members 82 via a link 84. Thus, when the preparation cylinder 83 is extended, the support 81 is pushed up, and thus a mount surface of the support can be caused to protrude upward from a top surface of the mount 74. At this time, the left and right positioning members 82 are also pushed up in tandem with the support 81 via the link 84 (see FIG. 7). On the other hand, when the preparation cylinder 83 is contracted, the support 81 descends under its own weight so that the mount surface is below the top surface of the mount 74, and the left and right positioning members 82 also descend under their own weight in tandem with the support 81 via the link 84. At this time, a piston rod of the preparation cylinder 83 is located at a distance from the support 81 (see FIG. 8).

The positioning members 82 are in an approximately C shape having an opening 82a of a height slightly greater than the thickness of the cassette 100 on the inner side in the right-left direction when viewed from the front, and have a stopper 821 that closes a back open end of the opening 82a. The positioning members 82 respectively restrict left and right side end faces of the cassette 100 with the openings 82a and also restrict a back end face in a front-back direction of the cassette 100 with the stoppers 821. That is to say, when the preparation cylinder 83 is in an extended state, it is possible to support the cassette 100 with the support 81 and the openings 82a of the left and right positioning members 82 while restricting the cassette 100 in the right-left direction and a backward direction with the positioning members 82. In this state, when the preparation cylinder 83 is contracted, the support 81 and hence the left and right positioning members 82 via the link 84 descend under their own weight, and thus it is possible to cause the mount 74 to support the cassette 100. At this time, the mounting holes 100a of the cassette 100 accept the fixing pins 743 of the mount 74, and thus the cassette 100 can be immovably fixed to the mount 74. Moreover, the openings 82a of the positioning members 82 press the step portions 102 formed at the left and right edges of the cassette 100 under their own weight.

Figure 9:
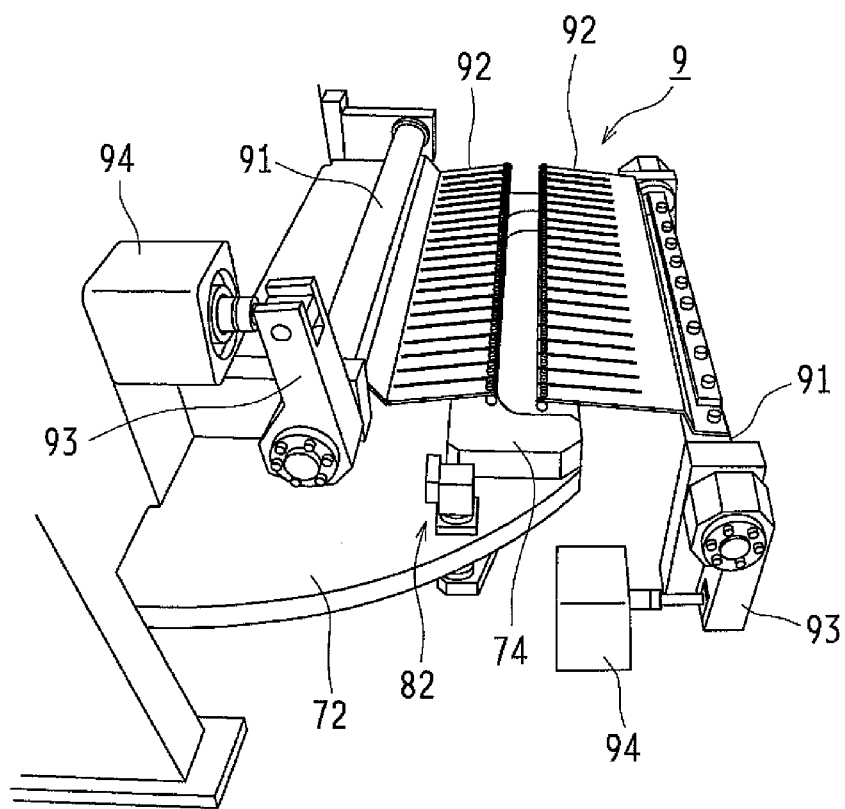
FIG. 9 is a perspective view showing a clamping device for insulating spacers.

The clamping device 9 is configured of, as shown in FIG. 9, a pair of rotation shafts 91 that are located above the rotary table 72 on the working position side facing the cutting blade 6 and that are rotatably supported by base 2 on the side facing the straight line portions of the rotary table 72, pressure plates 92 that are fixed to the respective rotation shafts 91, and clamping cylinders 94 that are respectively coupled to left and right ends of the rotation shafts 91 via arms 93. When the clamping cylinders 94 are extended, the rotation shafts 91 are rotated by a set angle via the arms 93, and leading end portions of the pressure plates 92 can be pressed against opposing base (short side) edges of a plurality of insulating spacers S aligned in the right-left direction on the cassette 100 fixed to the mount 74, the opposing base edges opposing each other in the front-back direction.

In each pressure plate 92, a plurality of slits having a set length are formed at intervals of a set width, and a plurality of piano key-like small pieces separated by the slits can individually elastically deform. Thus, leading end portions of the plurality of piano key-like small pieces can press the edges of the plurality of insulating spacers S on the short-side side through elastic deformation.

It should be noted that the base 2 is provided with an outer shutter 21 that is openable in the up-down direction via an outer cylinder (not shown) on the outside of the entrance facing the loading/unloading position of the rotary table 72, and an inner shutter 23 that is openable in the up-down direction via an inner cylinder 22 above the rotary table 72. The outer shutter 21 usually is in an ascended position and closes the entrance for the cassette 100, and is controlled so as to descend and open the entrance when the worker places the cassette 100 in the positioning device 8 or when the worker removes the cassette 100 from the positioning device 8. Moreover, the inner shutter 23 usually is in a descended position and divides the rotary table 72 into a front half (on the loading/unloading position side) and a back half (on the working position side) to shield the cutting blade 6, and is controlled so that the inner shutter 23 ascends so as not to interfere with the mount 74 and allows rotation of the rotary table 72 when the rotary table 72 is rotated 180 degrees between the loading/unloading position for the cassette 100 and the working position facing the cutting blade 6.

Moreover, a hood 56 that covers the cutting blade 6 is fixed to the rotation shaft device 5, and a duct 57 connected to a blower (not shown) is coupled to the hood 56. Thus, it is possible to suck shavings that occur when grooves Sa are formed in the insulating spacers S via the cutting blade 6 and collect the shavings to a predetermined position through pneumatic transportation. In this case, the duct 57 is connected to the box-shaped frame 41 of the Y-axis moving device 4 via a stay 58 and a flange 59, and when the insulating spacers S are cut by the cutting blade 6, or in other words, when the Y-axis moving device 4 moves in the right-left direction via the X-axis moving device 3, the duct 57 moves together with the Y-axis moving device 4 (see FIG. 1). Moreover, the flange 59 of the duct 57 moves along an opening formed in a ceiling portion of the base 2.

Next, operations of the groove machining apparatus 1 having a configuration as described above will be described.

It should be noted that although not shown in detail, it is possible for the groove machining apparatus 1 to automatically operate according to a program incorporated in a controller, based on a signal from a sensor such as a limit switch that detects an operation status of each device, and continuously cut grooves Sa in insulating spacers S. The automatic operation will be described below.

First, with regard to the cutting blade 6, in order that grooves Sa of a set width can be formed, the left-hand cutting blade 6L and the right-hand cutting blade 6R are placed together either directly or via one or more spacers 65 and fixed to the rotation shaft 52 of the rotation shaft device 5 via the locknut 55. Moreover, in order that grooves Sa of a set depth can be formed in insulating spacers S, the cutting blade 6 is held at a set level by the Y-axis moving device 4 and located at a starting end of the movement of the X-axis moving device 3. Furthermore, the positioning cylinder 75 is extended, so that the leading end of the positioning pin 76 fits into the positioning recess 721 of the rotary table 72 and stops the rotation of the rotary table 72. In addition, the preparation cylinder 83 of the positioning device 8 is extended, so that the support 81 and the left and right positioning members 82 are pushed up.

Meanwhile, the outer shutter 21 has descended due to contraction of the outer cylinder and opened the entrance, and the inner shutter 23 has descended due to extension of the inner cylinder 22 and blocked the front and the back of the rotary table 72. Thus, the worker can place the cassette 100, on which a plurality of insulating spacers S are aligned in the right-left direction in advance, in the positioning members 82 through the opened entrance. Specifically, it is possible for the worker to grasp the cassette 100, insert the outer back corners in the right-left direction of the cassette 100 into the openings 82a of the left and right positioning members 82 that are in the ascended position, and press the left and right edges of the back end face of the cassette 100 against the stoppers 821 to thereby cause the cassette 100 to be supported with the left and right positioning members 82 and the support 81.

In this state, if the outer cylinder is extended and the outer shutter 21 ascends and closes the entrance, the preparation cylinder 83 is contracted, and thus the support 81 and the left and right positioning members 82, which support the cassette 100, descend under their own weight, thereby mounting the cassette 100 on the mount 74. At this time, the mounting holes 100a of the cassette 100 accept the fixing pins 743 provided on the mount 74, so that the cassette 100 can be fixed to the mount 74. Once the cassette 100 is fixed to the mount 74, the positioning cylinder 75 is contracted, and thus the positioning pin 76 is disengaged from the positioning recess 721 provided in the rotary table 72, thereby removing the restriction on rotation of the rotary table 72. At the same time, the inner cylinder 22 is contracted to cause the inner shutter 23 to ascend, thereby allowing rotation of the rotary table 72. Then, once the inner shutter 23 ascends, the servomotor 73 of the turning device 7 is rotatively driven and causes the rotary table 72 to rotate 180 degrees, thereby moving the cassette 100 from the loading/unloading position facing the entrance to the cutting position facing the cutting blade 6.

Once the rotary table 72 has rotated, the positioning cylinder 75 is extended to cause the positioning pin 76 to ascend, and thus the leading end of the positioning pin 76 fits into the positioning recess 721 provided in the rotary table 72 and stops the rotation of the rotary table 72. At the same time, the inner cylinder 22 is extended to cause the inner shutter 23 to descend, thereby restricting the rotation of the rotary table 72. Moreover, once the inner shutter 23 has descended, the outer cylinder is contracted to cause the outer shutter 21 to descend, thereby opening the entrance. Thus, as described above, the worker can place the cassette 100, on which a plurality of insulating spacers S are aligned in the right-left direction in advance, in the left and right positioning members 82 and on the support 81 through the opened entrance. Once the cassette 100 is supported with the support 81 and the positioning members 82, the outer cylinder is extended, and the outer shutter 22 ascends, thereby closing the entrance. Then, the preparation cylinder 83 is contracted to cause the support 81 and the left and right positioning members 82 to descend, and thus the cassette 100 is mounted and fixed onto the mount 74.

On the other hand, as described above, once the rotary table 72 has rotated, the cassette 100 has moved to the working position facing the cutting blade 6, the rotation of the rotary table 72 has been stopped by the positioning pin 76 ascending, and the inner shutter 23 has descended, the clamping cylinders 94 of the clamping device 9 will be extended to rotate the rotation shafts 91 by a set angle via the arms 93, the leading ends of the piano key-like small pieces of the pressure plates 92 are pressed against the opposing short-side edges, which are opposed in the front-back direction, of the plurality of insulating spacers S aligned on the cassette 100 and elastically deformed, thereby immovably pressing the insulating spacers S against the cassette 100 and fixing them.

Once the insulating spacers S have been fixed by the clamping device 9, the servomotor 54 of the rotation shaft device 5 is rotatively driven to rotate the rotation shaft 52 and hence the cutting blade 6 via the belt pulley and also drive the blower (not shown), thereby sucking air in the hood 56 through the duct 57. At the same time, the servomotor 35 of the X-axis moving device 3 is rotatively driven to move the nut member 33 and hence the moving frame 36 along the linear bearings 34 toward the right hand side in FIG. 1. Thus, the cutting blade 6 sequentially cuts the insulating spacers S, and at this time, grooves Sa having a machined surface with excellent smoothness and having a set width and a set depth are formed while suppressing burring and fuzzing. Specifically, with the flat blade 63L of the left-hand cutting blade 6L and the flat blade 63R of the right-hand cutting blade 6R, which are placed together, the insulating spacers S are sequentially cut to the set depth and a width corresponding to the width of cut of the blades, so that grooves Sa having a machined surface with excellent smoothness and having the set width and the set depth are formed, and with the left marking blade 64L of the left-hand cutting blade 6L and the right marking blade 64R of the right-hand cutting blade 6R, cutting faces having a set depth and having a machined surface with excellent smoothness are formed in the insulating spacers S at the positions corresponding to the left and right side edges of the grooves Sa.

At this time, shavings that have been cut by the cutting blade 6 are sucked from the hood 56 through the duct 57 and pneumatically transported to a predetermined position.

In this manner, grooves Sa of a set width and a set depth are sequentially formed in the insulating spacers S, and once the grooves Sa are formed in all of the insulating spacers S, and the X-axis moving device 3 reaches a stroke end, the servomotor 45 of the Y-axis moving device 4 is rotatively driven and thus moves the nut member 43 and hence the lifting/lowering frame 46 downward along the linear bearings 44 slightly in units of 0.1 mm. Afterward, the servomotor 35 of the X-axis moving device 3 is rotatively driven in reverse and thus moves the moving frame 36 via the nut member 33 to the left hand side in FIG. 1 along the linear bearings 34. Thus, the cutting blade 6 slightly cuts the insulating spacers S in such a manner that the cutting blade 6 again traces the grooves Sa of the set width and the set depth, which have been previously formed in the insulating spacers S by the forward stroke.

Therefore, while it is possible during cutting by the forward stroke of the cutting blade 6 to suppress burring and fuzzing with the cutting blade 6 and to thereby form grooves Sa having a machined surface with excellent smoothness, even if a burr or fuzz occurs on the machined surface of the grooves, the burr or the fuzz is removed by slightly cutting during the backward stroke, and therefore postprocessing is not required. Thus, it is possible to efficiently form grooves having a machined surface with excellent smoothness in a plurality of insulating spacers S.

Once the X-axis moving device 3 reaches the starting end of its movement, rotative driving of the servomotor 35 stops. Moreover, the servomotor 45 of the Y-axis moving device 4 is rotatively driven in reverse, and when the lifting/lowering frame 46 ascends slightly and reaches the initial state, the rotative driving stops. At the same time, driving of the blower (not shown) stops. Furthermore, the clamping cylinders 94 of the clamping device 9 are contracted to cause the rotation shafts 91 to rotate by a set angle to their original positions via the arms 93, thereby disengaging the pressure plates 92 from the plurality of insulating spacers S with respect to which the groove machining work has been completed.

Once the pressure plates 92 of the clamping device 9 disengage from the insulating spacers S, the positioning cylinder 75 is contracted to remove the restriction on rotation of the rotary table 72, and the inner cylinder 22 is contracted to cause the inner shutter 23 to ascend. Since this allows the rotary table 72 to rotate, the servomotor 73 of the turning device 7 is rotatively driven, and the rotary table 72 rotates 180 degrees. Therefore, the cassette 100, on which the plurality of insulating spacers S with respect to which the groove machining work has been completed are aligned, moves to the loading/unloading position opposing the entrance, and a cassette 100 on which a plurality of unmachined insulating spacers S are aligned moves to the working position facing the cutting blade 6. Subsequently, the positioning cylinder 75 is extended to cause the positioning pin 76 to ascend, thereby stopping the rotation of the rotary table 72. At the same time, the inner cylinder 22 is extended to cause the inner shutter 23 to descend, thereby restricting the rotation of the rotary table 72. Moreover, the preparation cylinder 83 of the positioning device 8 on the loading/unloading position side facing the entrance is extended to push up the support 81 and the positioning members 82 via the link 84, thereby lifting the cassette 100 on which the plurality of insulating spacers S with respect to which the groove machining work has been completed are aligned so as to disengage the cassette 100 from the fixing pins 743 on the mount 74.

Once the cassette 100 on which the plurality of insulating spacers S with respect to which the groove machining work has been completed are aligned is lifted, the outer cylinder is contracted to cause the outer shutter 21 to descend, thereby opening the entrance. Thus, the worker can remove the cassette 100, on which the insulating spacers S with respect to which the groove machining work has been completed and which is supported by the support 81 and the positioning members 82, through the entrance. Once the cassette 100 is removed, a new cassette 100 on which a plurality of unmachined insulating spacers S are aligned in the right-left direction in advance is disposed in the left and right positioning members 82 and on the support 81 through the opened entrance. Once the cassette 100 is supported with the support 81 and the positioning members 82, the outer cylinder is extended, and thus the outer shutter 22 ascends and closes the entrance.

Thereafter, as described above, on the rotary table 72, while the cassette 100 that is located on the loading/unloading position side opposing the entrance is fixed to the mount 74 and is ready for the next groove machining work, the insulating spacers S aligned on the cassette 100 on the working position side facing the cutting blade 6 undergo groove machining work by the cutting blade 6.

The present invention can be carried out in various other forms without departing from the spirit and essential characteristics thereof. Therefore, the embodiment described above is to be considered in all respects as illustrative only, and not as being restrictive. The scope of the present invention is defined by the appended claims and should not be restricted to the description hereinabove. Furthermore, all modifications and changes which come within the meaning of equivalency of the claims are intended to be embraced by the scope of the present invention.

What is claimed is:

1. A groove machining apparatus for an insulating spacer, comprising:
    a cutting blade that is removably fixed to a rotation shaft rotatable around a horizontal axis of a rotation shaft device and that is moveable in a right-left direction and in an up-down direction via an X-axis moving device and a Y-axis moving device, respectively;
    a rotary table that is rotatable around a vertical axis of a turning device, the rotary table having a loading/unloading position and a working position 180 degrees apart from the loading/unloading position;
    a cassette having an elongated recess extending in the right and left direction when under the cutting blade, wherein a plurality of insulating spacers may be disposed in the recess;
    mounts disposed underneath the cassette, the mounts being fixed in the loading/unloading position and opposing an entrance though which the cassette can be loaded/unloaded and in the working position facing the cutting blade;
    positioning devices that are respectively located on each side of the cassette in the vicinity of the mounts to position and fix each cassette to the mounts; and
    a clamping device disposed on the top of the cassette in the working position presses opposing edges in a front-back direction of a plurality of insulating spaces aligned on the cassette,
    wherein the cassette disposed in the positioning device in the loading/unloading position is fixed to the mount and rotated 180 degrees to the working position facing the cutting blade, the opposing edges in the front-back direction of the plurality of insulating spacers aligned on the cassette are pressed and fixed, and the cutting blade rotating at a set level is moved in the right-left direction, so that grooves of a set width and a set depth are sequentially formed in the plurality of insulating spacers.

2. The groove machining apparatus for an insulating spacer according to claim 1, comprising;

a liftable inner shutter that blocks the working position and the loading/mounting position of the rotary table; and a liftable outer shutter that blocks the entrance opposing the loading/unloading position.

3. A groove machining method for an insulating spacer, comprising;

the plurality of insulating spacers are aligned and disposed in the recess of the cassette and are fixed to a rotary table and whose opposing edges in a front-back direction are pressed to face a cutting blade that can move back and forth in a right-left direction and in an up-down direction and that can rotate around a horizontal axis;

moving the cutting blade in the right-left direction while rotating the cutting blade at a set level; and forming grooves of a set width and a set depth sequentially in the plurality of insulating spacers.

4. The groove machining method for an insulating spacer according to claim 3, wherein the cutting blade is formed by placing together a left-hand cutting blade in which a plurality of sets of a flat blade and a left marking blade are provided and a right-hand cutting blade in which a plurality of sets of a flat blade and a right marking blade are provided in such a manner that the sets of the flat blade and the left marking blade of the left-hand cutting blade and the sets of the flat blade and the right marking blade of the right-hand cutting blade alternate.

5. The groove machining method for an insulating spacer according to claim 4, wherein one or more spacers are disposed between the left-hand cutting blade and the right-hand cutting blade.

6. The groove machining method for an insulating spacer according to claim 4, wherein the cutting blade when moving backward is lower than that when moving forward by a set height.

7. The groove machining method for an insulating spacer according to claim 3, wherein the cutting blade when moving backward is lower than that when moving forward by a set height.

* * * * *